J. COMLY.
MANUFACTURE OF GEAR-WHEELS.
No. 7,584. Reissued April 3, 1877.
Fig
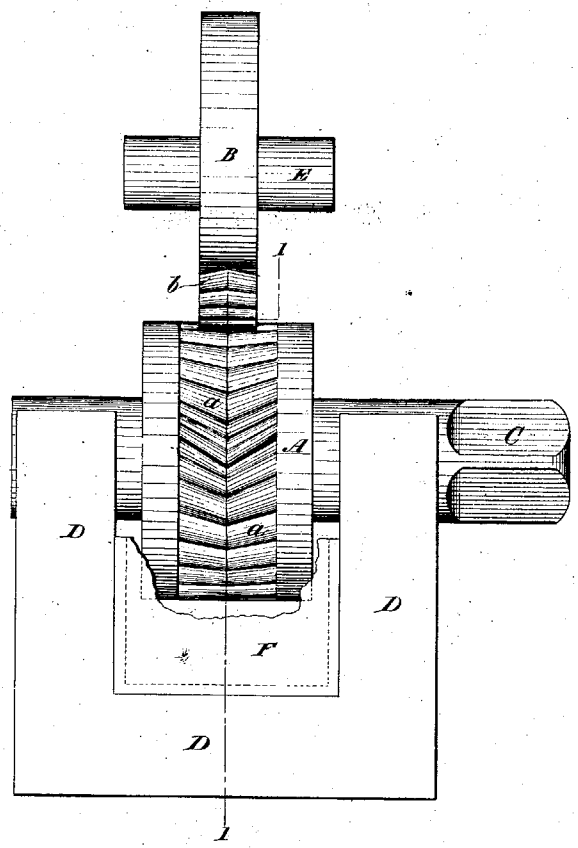
Fig 2.
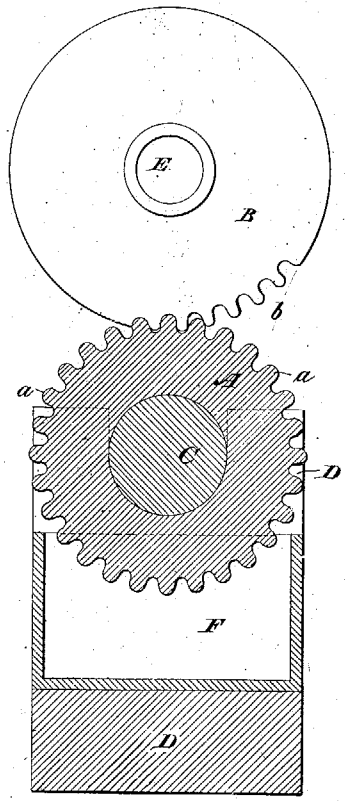
WITNESSES
Wm. A. Simkle
F. Sieh
INVENTOR
John Comly.
By his Attorneys
Baldwin, Hopkins & Peyton.

UNITED STATES PATENT OFFICE.

JOHN COMLY, OF WILLIAMSBURG, NEW YORK.

IMPROVEMENT IN THE MANUFACTURE OF GEAR-WHEELS.

Specification forming part of Letters Patent No. 132,899, dated November 12, 1872; reissue No. 7,584, dated April 3, 1877; application filed February 19, 1877.

*To all whom it may concern:*

Be it known that I, JOHN COMLY, of Williamsburg, in the county of Kings and the State of New York, have invented certain new and useful Improvements in Manufacturing Gear-Wheels, of which the following is a specification:

The object of my invention is to produce a gear-wheel from a prepared heated blank wheel by a single operation, and in a cheap, expeditious, and simple manner.

To this end my improvements consist in a novel method of forming the teeth of gear-wheels, which method consists in mounting a heated blank wheel or disk in such a manner as to be capable of rotating with its rim or periphery in contact with the periphery of a suitable toothed die or former, the projections and depressions on the die to be of proper shape to form upon the blank such teeth as may be desired, and rotating said die to cause the teeth thereon to successively press into the blank's periphery and rotate it while forcing the metal thereof into the spaces between the die-teeth, whereby a completely-toothed wheel is produced by revolving the die and blank.

My improvements further consist in the combination of a rotating die or toothed wheel, its driving-shaft revolved by suitable mechanism, a supporting-frame, and a mandrel which carries a blank wheel or disk mounted so as to rotate with its periphery bearing against the die, the teeth of which embed themselves in the blank wheel as the die is revolved to form the gear-teeth.

Teeth are made for spur, bevel, or any other desired form of gearing by constructing the the teeth of the die of proper form. The blank wheel, before being placed on the mandrel, is brought to a red heat to give practicability to the perfect formation of the teeth.

For the purpose of cooling the die-teeth after they pass the hot wheel, successively, there is a water-trough in which the lower edge of the die runs.

Figure 1 of the drawings is a front elevation, and Fig. 2 is a vertical section, on the line 1 1 of Fig. 1.

A represents a circular die, having zigzag teeth *a* on its periphery for pressing into shape teeth *b* on the periphery of the wheel B, as the two wheels are caused to revolve by power applied to the shaft C of the die, by means of a crank or otherwise, the journals of the shaft being supported by the frame D and those of the mandrel E, on which the wheel B is placed, by any suitable means.

The wheel or disk B is brought to a red heat before it is brought into position, as shown in the drawing, to admit the teeth *a* of the wheel or die A pressing easily into its periphery, and forming the teeth *b*. The die is cooled as it revolves by its under edge running in the water-trough F.

It will readily appear that any form of teeth may be constructed in the manner above described by making the teeth of the die A of the requisite form, and that the teeth of the wheels, in consequence of being greatly condensed by the action of the die, will be much stronger than when formed by a cutting machine or in casting.

I claim as my invention—

1. The hereinbefore-described method of manufacturing gear-wheels, which consists in rotating a toothed die or former in contact with a heated blank wheel, whereby teeth are formed on the periphery of the blank wheel as it rotates.

2. The combination, substantially as hereinbefore set forth, of a revolving toothed die or former, its shaft, and supporting-frame, with a mandrel which carries a blank wheel, whereby teeth are formed upon the blank wheel as it rotates in contact with the former.

JOHN COMLY.

Witnesses:
GEORGE H. KRACHT,
EDW. W. SERRELL, Jr.